United States Patent
Mitani et al.

(10) Patent No.: US 11,900,669 B2
(45) Date of Patent: Feb. 13, 2024

(54) CALIBRATION DEVICE AND CALIBRATION METHOD

(71) Applicant: HITACHI, LTD., Tokyo (JP)

(72) Inventors: Keiichi Mitani, Tokyo (JP); Kazuyuki Tajima, Tokyo (JP); Kazuyoshi Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 71 days.

(21) Appl. No.: 17/528,582

(22) Filed: Nov. 17, 2021

(65) Prior Publication Data

US 2022/0180086 A1 Jun. 9, 2022

(30) Foreign Application Priority Data

Dec. 4, 2020 (JP) .................. 2020-201534

(51) Int. Cl.
| | | |
|---|---|---|
| *G06V 20/00* | (2022.01) | |
| *G06V 20/13* | (2022.01) | |
| *G06V 20/54* | (2022.01) | |
| *G06V 10/147* | (2022.01) | |
| *G06V 10/22* | (2022.01) | |

(Continued)

(52) U.S. Cl.
CPC .............. *G06V 20/13* (2022.01); *G06F 18/00* (2023.01); *G06F 18/22* (2023.01); *G06F 18/231* (2023.01); *G06V 10/147* (2022.01); *G06V 10/22* (2022.01); *G06V 20/54* (2022.01)

(58) Field of Classification Search
CPC ...... H04N 23/90; H04N 23/60; H04N 13/246; H04N 23/698; H04N 17/002; G06T 7/70; G06T 2207/10028; G06V 20/13; G06V 10/147; G06V 10/22; G06V 20/54; G06V 10/74; G06F 18/00; G06F 18/22; G06F 18/231; G06F 16/29; G01S 7/4972
See application file for complete search history.

(56) References Cited

U.S. PATENT DOCUMENTS

| | | | |
|---|---|---|---|
| 2010/0172598 A1* | 7/2010 | Kimura ................ | H04N 5/2628 382/296 |
| 2016/0063704 A1* | 3/2016 | Sasaki .................. | H04N 13/239 382/154 |

(Continued)

FOREIGN PATENT DOCUMENTS

| | | |
|---|---|---|
| JP | 2005-233639 A | 9/2005 |
| JP | 2007-327750 A | 12/2007 |

*Primary Examiner* — Emily C Terrell
*Assistant Examiner* — Ahmed A Nasher
(74) *Attorney, Agent, or Firm* — Volpe Koenig

(57) ABSTRACT

A calibration device performs a calibration between a plurality of imaging devices, each of which outputs field-of-view information which is information on a field-of-view of the imaging device itself. The field-of-view information contains a bitmap image and a range image. The calibration device includes: a state estimation part configured to detect, in a field of view of a first imaging device, an image of a second imaging device, and estimate a relative position and a relative attitude of the second imaging device with respect to the first imaging device, based on the detected image; and a transformation information calculation part configured to calculate transformation information between a coordinate system of the first imaging device and a coordinate system of the second imaging device, based on the estimated relative position and relative attitude.

10 Claims, 5 Drawing Sheets

(51) Int. Cl.
    *G06F 18/22*     (2023.01)
    *G06F 18/00*     (2023.01)
    *G06F 18/231*     (2023.01)

(56) References Cited

U.S. PATENT DOCUMENTS

| | | | | |
|---|---|---|---|---|
| 2017/0094256 | A1* | 3/2017 | Bronstein | G01B 11/2545 |
| 2018/0343421 | A1* | 11/2018 | Kahle | G01C 11/06 |
| 2019/0156506 | A1* | 5/2019 | Fisher | G06T 7/70 |
| 2019/0304105 | A1* | 10/2019 | Gao | G06V 10/454 |
| 2020/0089971 | A1* | 3/2020 | Li | G01S 7/4972 |
| 2020/0278197 | A1* | 9/2020 | Tokimitsu | G01B 11/2513 |
| 2020/0388004 | A1* | 12/2020 | Zhang | G06T 7/337 |
| 2021/0051262 | A1* | 2/2021 | Wang | H04N 23/675 |
| 2021/0152802 | A1* | 5/2021 | Varekamp | H04N 13/246 |

\* cited by examiner

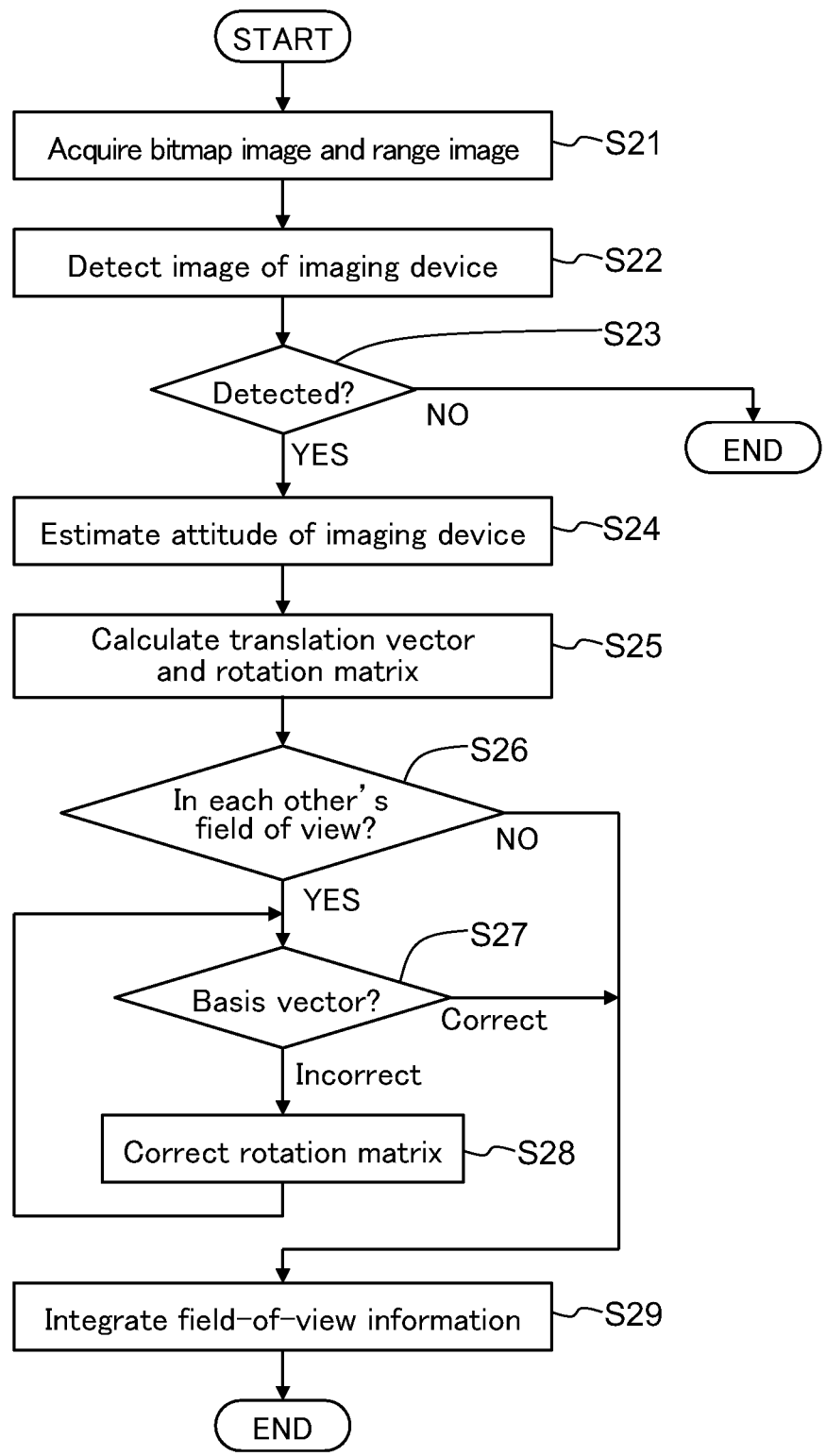

CALIBRATION DEVICE AND CALIBRATION METHOD

CROSS REFERENCE TO RELATED APPLICATIONS

This application claims the benefit of Japanese Patent Application No. 2020-201534 filed on Dec. 4, 2020, the disclosure of which is incorporated herein by reference.

BACKGROUND OF THE INVENTION

1. Field of the Invention

The present invention relates to a calibration device and a calibration method, in each of which coordinate systems of imaging devices are integrated.

2. Description of the Related Art

In tracking a moving body or creating a 2D/3D spatial map in a space, using a plurality of imaging devices, calibration between the imaging devices (adjustment for integration of coordinate systems thereof) is required. When a plurality of imaging devices are fixed in their positions or directions in a facility such as a venue, calibration is not needed because an appropriate layout of the fixed imaging devices makes it possible to use the positions or directions of the imaging devices as hyperparameters. Even in that case, however, when the original positions or directions are subjected to change due to disaster such as an earthquake and a conversion of a facility of interest, calibration becomes necessary.

Imaging devices may be installed in an autonomous robot in a work site in which information on a space such as a landform is constantly changing or in a building site in which BIM (Building Information Modeling) data on a building is acquired on a real-time basis. In that case, the imaging device has a high flexibility to change positions thereof (can freely move or change an orientation thereof), which requires a high-speed calibration.

Patent Document 1 discloses a camera position detecting method that processes: a first step for photographing a plurality of cameras by a panoramic camera; a second step for controlling driving mechanisms to make the plurality of cameras operate; a third step for making the panoramic camera photograph the plurality of cameras, after the plurality of cameras are made to operate; a fourth step for processing data for specifying the plurality of cameras in photographed images on the basis of data on difference images acquired, by photographing the cameras before and after the plurality of cameras are made to operate; and a fifth step for processing data for computing the positions of the plurality of cameras, on the basis of images in which a plurality of specified cameras are photographed.

Patent Document 2 discloses a stereo camera system that includes: a first and a second stereoscopic camera; a 3-D position calculating part for calculating a first and a second 3-D position of a person captured in the first and second stereoscopic images by the principle of stereoscopic view, based on the first and the second stereoscopic images; a region of projected person calculating part for forming the first and second images, including the first and second regions of projected person which correlate with the projected image of the person captured in the first and second stereoscopic images projected to the 2-D plane, based on the first and second 3-D position; and a calibration correction part for calibration of camera-to-camera of stereoscopic type, based on the relative positional relation of the first and second regions of projected person, when the number of regions of projected person included in the first and second images are the same.

RELATED ART DOCUMENTS

Patent Documents

[Patent Document 1] Japanese Laid-Open Patent Application, Publication No. 2007-327750
[Patent Document 2] Japanese Laid-Open Patent Application, Publication No. 2005-233639

SUMMARY OF THE INVENTION

Problems to be Solved by the Invention

By using the conventional technology as described above, when one of imaging devices (cameras) is fixed to a prescribed site and is imaged by another imaging device, the fixed imaging device can detect a position in which another imaging device is present, based on which calibration (or adjustment of positions of the cameras) can be performed. In this case, however, it is required that the cameras are positioned horizontally flush with or constantly facing each other, which makes it difficult to apply to an imaging device having a high flexibility to change installed positions thereof. To make up for the deficiency, intercalibration may be performed, based on a relative positional relationship between projected person domains in 3D positions using a stereo camera. This may ensure, under the above-described condition of the fixed imaging device, a certain degree of flexibility to change installed positions of another imaging device, though only applicable to a situation in which a person is present. Additionally, the intercalibration as described above requires several corrections under some imaging environments, which may lead to loss of time.

In light of the background described above, the present invention has been made in an attempt to provide a calibration device and a calibration method, in each of which calibration can be performed even when an imaging device having a high flexibility to change installed positions thereof is used, for example, when the imaging device itself moves around.

Means for Solving the Problems

To solve the problems described above, the present invention provides a calibration device which performs a calibration between a plurality of imaging devices, each of which outputs field-of-view information which is information on a field-of-view of the imaging device itself. The field-of-view information including a bitmap image and a range image. The calibration device includes: a state estimation part configured to detect, in a field of view of a first imaging device, an image of a second imaging device, and estimate a relative position and a relative attitude of the second imaging device with respect to the first imaging device, based on the detected image; and a transformation information calculation part configured to calculate transformation information between a coordinate system of the first imaging device and a coordinate system of the second imaging device, based on the estimated relative position and relative attitude.

Advantageous Effects of the Invention

The present invention can provide a calibration device and a calibration method, in each of which calibration of an imaging device can be performed even when the imaging device has a high flexibility to change installed positions thereof. Further problems, structures and advantageous effects of the present invention other than the described above will be apparent from explanation in the following embodiments.

BRIEF DESCRIPTION OF THE DRAWINGS

FIG. 12 is a flowchart of the calibration processing according to the second embodiment.

DETAILED DESCRIPTION OF EMBODIMENTS

<<Imaging Device>>

Prior to explanation of a calibration device according to an embodiment for carrying out the present invention, an imaging device to which calibration is performed is described.

Figure 1:
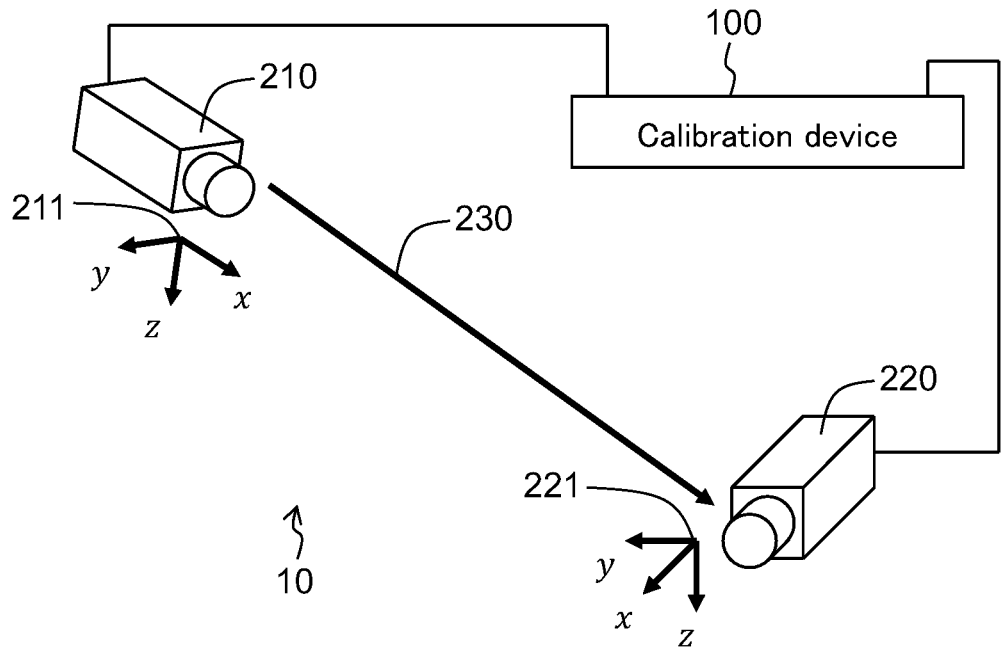
FIG. 1 is a diagram illustrating an entire configuration of a calibration system according to a first embodiment of the present invention.

FIG. 1 is a diagram illustrating an entire structure of a calibration system 10 according to a first embodiment of the present invention. The calibration system 10 includes a calibration device 100 and a pair of imaging devices 210, 220. Each of the imaging devices 210, 220: is capable of measuring a distance between itself and a target to be imaged (a subject); and outputs a bitmap image (for example, a RGB image, see FIG. 3 to be described hereinafter) and a range image (see FIG. 4 to be described hereinafter) which is an image in which a pixel represents a distance, to the calibration device 100.

Each of the imaging devices 210, 220 may have any circuit architecture, any type or position of a sensor installed therein, or the like, as long as each of the devices 210, 220 is capable of measuring a distance. For example, the devices 210, 220 may be each a stereo camera with two CMOS (Complementary Metal Oxide Semiconductor) image sensors installed therein. Or, the devices 210, 220 may be each a device composed of a combination of a simple RGB camera and a ToF (Time-of-Flight) sensor using infrared laser combined with an image sensor, in which a relationship between respective pixel positions is appropriately adjusted. Alternatively, in place of the ToF sensor, the devices 210, 220 may be each a device using a structured light sensor composed of a combination of a projection pattern light emitting device and an image sensor.

A pixel in a range image can be converted into a 3D coordinate by means of a coordinate transformation. A group of points represented by the transformed 3D coordinate is referred to as a point cloud. Note that a bitmap image and a range image may be collectively referred to as a field-of-view image (or field-of-view information) hereinafter.

The imaging devices 210, 220 have 3D coordinate systems 211, 221, respectively. The coordinate systems 211, 221 is each a right-handed coordinate system in which: a direction in which each of the imaging devices 210, 220 takes an image is denoted as x-axis; and a downward direction with respect to each of the x-axes is denoted as z-axis. An image of the imaging device 220 is in a field of view of the imaging device 210. A field-of-view image outputted by the imaging device 210 contains an image of the imaging device 220.

An origin of each of the coordinate systems 211, 221 is, for example, a center of a lens disposed in a front end portion thereof. In order to provide an easy view, however, FIG. 1 illustrates the coordinate systems 211, 221 with the lens centers thereof off the respective origins. A translation vector 230 is a position vector of the imaging device 220 viewed from the imaging device 210.

<<Outline of Calibration Device>>

The calibration device 100 detects the imaging device 220 contained in a field-of-view image of the imaging device 210. The calibration device 100 then estimates a distance and a direction of the imaging device 220 (the translation vector 230 illustrated in FIG. 1) with respect to the imaging device 210, based on a position and a distance of a point cloud of the imaging device 220 in a range image. The calibration device 100 computes a major component in a spread of the point cloud. The calibration device 100 thereby estimates an attitude (an orientation, that is, the coordinate system 221) of the imaging device 220.

A rotation matrix representing a rotation by which the coordinate system 221 is brought to a position parallel to the coordinate system 211 is calculated from the estimated result of the attitude of the imaging device 220. By using the translation vector 230 and the rotation matrix, the coordinate systems 211, 221 can be transformed into each other, thus allowing respective field-of-view images of the imaging devices 210, 220 to be integrated. Therefore, the translation vector 230 and the rotation matrix may be collectively referred to as transformation information. Note that calibration means computation of the transformation information.

The translation vector 230 and the rotation matrix are calculated based on information on an image of the imaging device 220 contained in a field-of-view image of the imaging device 210. At this time, it is not necessary that respective fields of view of the two imaging devices 220, 230 contain each other's imaging devices 220, 230. The calculation can be done with a field of view of just one of the imaging devices 210, 220 containing an image of the other.

The calculation is performed using only information on pixels corresponding to an image of one of the imaging devices 210, 220 contained in a field-of-view image of the other, which requires a small processing load. As a result, a high-speed calibration of an imaging device having a high flexibility to change positions thereof can be performed.

Note that description below is made assuming that an image of the imaging device 220 is contained in a field of view of the imaging device 210.

<<Configuration of Calibration Device>>

Figure 2:
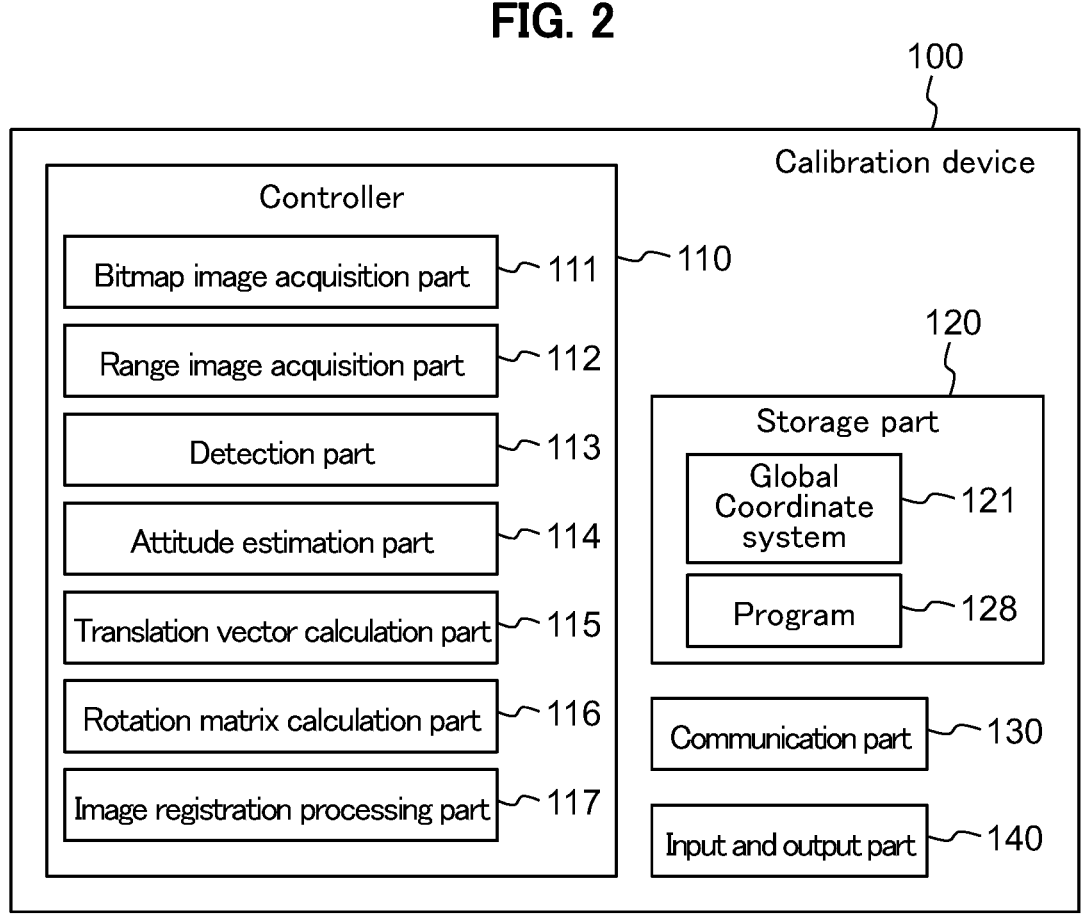
FIG. 2 is a functional block diagram illustrating a calibration device according to the first embodiment of the present invention.

FIG. 2 is a functional block diagram illustrating the calibration device 100 according to the first embodiment. The calibration device 100 includes a controller 110, a storage part 120, a communication part 130, and an input and output part 140. The communication part 130 allows an input of communication data including a field-of-view image from the imaging devices 210, 220. The communication part 130 transmits communication data including a field-of-view image, calculated transformation information, or an integrated field-of-view image using transformation information. The input and output part 140 is connected to a user interface device such as a display, a keyboard, and a mouse.

The storage part 120 is realized by a ROM (Read Only Memory), a RAM (Random Access Memory), a SSD (Solid State Drive), or the like. The storage part 120 stores therein a global coordinate system 121, a program 128, and the like. The global coordinate system 121: is information on a coordinate system shared by the imaging devices 210, 220; and includes information on a basis vector and an origin of the coordinate system. Alternatively, the coordinate system 211 of the imaging device 210 may serve as the global coordinate system 121. The program 128 includes description of steps of a calibration processing to be explained later (see FIG. 5 to be described hereinafter).

<<Calibration Device: Controller: Bitmap Image Acquisition Part and Range Image Acquisition Part>>

The controller 110: is realized by a CPU (Central Processing Unit) and the like; and includes a bitmap image acquisition part 111, a range image acquisition part 112, a detection part 113, an attitude estimation part 114, a translation vector calculation part 115, a rotation matrix calculation part 116, and an image registration processing part 117. The bitmap image acquisition part 111 acquires a bitmap image from a field-of-view image received from the imaging devices 210, 220. The range image acquisition part 112 acquires a range image from a field-of-view image received from the imaging devices 210, 220.

Figure 3:
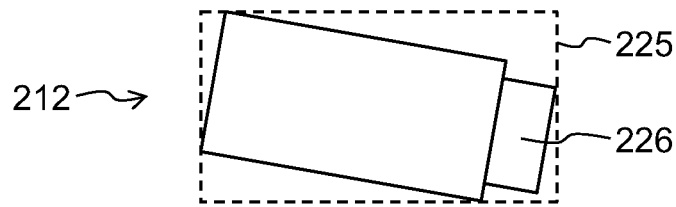
FIG. 3 is a bitmap image of one of a pair of imaging devices taken and outputted by the other according to the first embodiment of the present invention.

FIG. 3 illustrates a bitmap image 212 of the imaging device 220 taken and outputted by the imaging device 210 according to the first embodiment. A subject 226 is an image of the imaging device 220 in the bitmap image 212.

Figure 4:
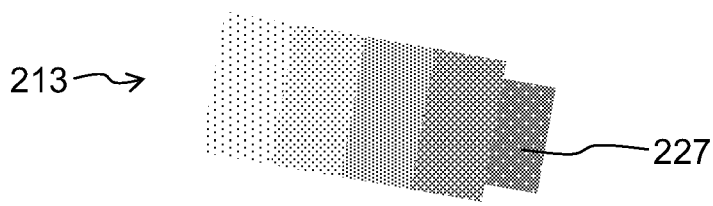
FIG. 4 is a range image of the one imaging device imaged and outputted by the other according to the first embodiment of the present invention.

FIG. 4 illustrates a range image 213 of the imaging device 220 taken and outputted by the imaging device 210 according to the first embodiment. A subject 227 is an image of the imaging device 220 in the range image 213. The range image is an image in which information on range is added to each of pixels therein. In FIG. 4, a range is represented by luminance of a pixel. Compared with a left-hand portion of the imaging device 220 with respect to the plane of FIG. 7, a right-hand portion thereof looks darker (lower in luminance), which means that a range in the right-hand portion is larger (farther away). Note that, though a background of the imaging device 220 is actually darker (lower in luminance) than the subject 227, FIG. 4 skips illustrating the background to facilitate visualization.

<<Calibration Device: Controller: Detection Part>>

Referring back to FIG. 2, the detection part 113 detects an image of the imaging device 220 contained in the bitmap image acquired by the bitmap image acquisition part 111, using an appropriate image processing. One of the simplest techniques of such a detection step is that a seal having a characteristic color or a high infrared reflectivity or any other characteristics is put on all or a desired part of the imaging device 220, based on pixel values of which the imaging device 220 is detected and is subjected to segmentation. Another technique uses machine learning technology (for example, CNN (Convolutional Neural Network)) with images of an imaging device of interest as training data and performs an inference processing. A result of the detection may be presented in an area 225 (see FIG. 3) which is a detection window (for example, a rectangle) of a convex hull covering an entire image of a subject as a target for the detection or may be presented in an area in which pixels corresponding to an image of the imaging device 220 (the subject 226) are present.

<<Calibration Device: Controller: Attitude Estimation Part>>

The attitude estimation part 114 estimates an attitude (an orientation, that is, the coordinate system 221 in FIG. 1) of the imaging device 220 with respect to the imaging device 210, based on a result detected by the detection part 113 (see the area 225 in FIG. 3). using the range image acquired by the range image acquisition part 112. How to estimate an attitude is described below.

The attitude estimation part 114: identifies pixels of an image of the imaging device 220 contained in the range image, based on the detected result; and performs a coordinate transformation of the identified pixels, to thereby obtain a distribution of a point cloud corresponding to the imaging device 220 in the coordinate system 211 (see FIG. 1). The attitude estimation part 114 computes an attitude of the imaging device 220 from the distribution of the point cloud. The attitude estimation part 114: calculates a major component, based on the distribution of the point cloud; and thereby computes a coordinate axis of the coordinate system 221. More specifically, the attitude estimation part 114: computes a covariance matrix using a relative position vector of each of points in the point cloud having a position of a centroid of the distribution of the point cloud as an origin of the coordinate system 221; and thereby calculates an eigenvalue and an eigenvector of the computed covariance matrix. The attitude estimation part 114 then takes respective directions of eigenvectors corresponding to three large eigenvalues as coordinate axes. The respective coordinate axes are shown as basis vectors (each with a length of 1).

<<Calibration Device: Controller: Translation Vector Calculation Part>>

The translation vector calculation part 115 calculates a position vector (the translation vector 230 illustrated in FIG. 1) from the imaging device 210 to the imaging device 220, based on the result detected by the detection part 113 (see the area 225 in FIG. 3), using the range image acquired from the range image acquisition part 112. For example, the translation vector calculation part 115: acquires a point cloud of an image of the imaging device 220 in the coordinate system 211; and determines a position of a centroid of the point cloud as a translation vector.

<<Calibration Device: Controller: Rotation Matrix Calculation Part>>

The rotation matrix calculation part 116 calculates a rotation matrix by which the x-y-z coordinate axes (basis vectors) of the coordinate system 221 outputted by the attitude estimation part 114 rotates to align with the x-y-z coordinate axes of the coordinate system 211, respectively. How to calculate the rotation matrix is described next. Let $x=(x_x, x_y, x_z)$ be the basis vector of the x-axis of the coordinate system 221 in the coordinate system 211; and, $z=(z_x, z_y, z_z)$, the basis vector of the z-axis.

A rotation transformation (at a rotation transformation angle of about the x-axis of the coordinate system 211 and a rotation transformation (at a rotation transformation angle of n) about the y-axis thereof are performed in this order, such that a direction of the basis vector z in the coordinate system 221 be flush with a direction of the z-axis in the coordinate system 211. At this time, each of x component and y component of the basis vector z takes a value of "0", thus allowing the rotation transformation angles of and n to be calculated from Formula (1) and Formula (2), respectively.

$$\tan(\xi) = \frac{z_y}{z_z} \quad (1)$$

$$\tan^2(\eta) = \frac{z_x^2}{z_y^2 + z_z^2} \quad (2)$$

The rotations described above make the basis vector x and the basis vector y positioned on the x-y plane in the coordinate system 211 of the imaging device 210. A rotation transformation (at a rotation transformation angle is then performed about the z-axis of the coordinate system 211, such that directions of the basis vector x and the basis vector y be flush with directions of the x-axis and the y-axis in the coordinate system 211, respectively. At this time, y component of the basis vector x takes a value of "0", thus allowing the rotation transformation angles to be calculated from Formula (3).

$$\tan^2(\zeta) = \begin{vmatrix} x_y & x_z \\ z_y & z_z \end{vmatrix}^2 \bigg/ \begin{vmatrix} x_x & x_y & x_y \\ z_x & z_y & z_z \\ 0 & -z_z & z_y \end{vmatrix}^2 \quad (3)$$

By multiplying a rotation matrix (a 3×3 matrix) of the rotation transformation angles ξ, η, and ζ obtained as described above in order of operations from the left, a rotation matrix can be calculated by which the x-y-z coordinate axes of the coordinate system 221 rotates to align with the x-y-z coordinate axes of the coordinate system 211, respectively.

The image registration processing part 117 integrates respective field-of-view images of the imaging devices 210, 220, based on the translation vector calculated by the translation vector calculation part 115 and the rotation matrix calculated by the rotation matrix calculation part 116. That is, the image registration processing part 117 makes a pair of points—one contained in one of the two field-of-view images and another contained in the other—which are to be aligned by a coordinate transformation between the coordinate systems 211, 221 using the translation vector and the rotation matrix (transformation information), correspond (registered) to each other. The image registration processing part 117 also makes appropriate adjustment to a basis vector and a position vector contained in the global coordinate system 121 (a coordinate transformation).

To make sure of a higher accuracy of correspondence (registration) between points, an ICP (Iterative Closest Point) registration processing is performed. In iteratively computing a corresponding point in the ICP registration processing, transformation information may be used as an initial value of the iterative computation processing. This can reduce the number of times of the iterative computation processings and also prevent initial value dependence.

<<Calibration Processing>>

Figure 5:
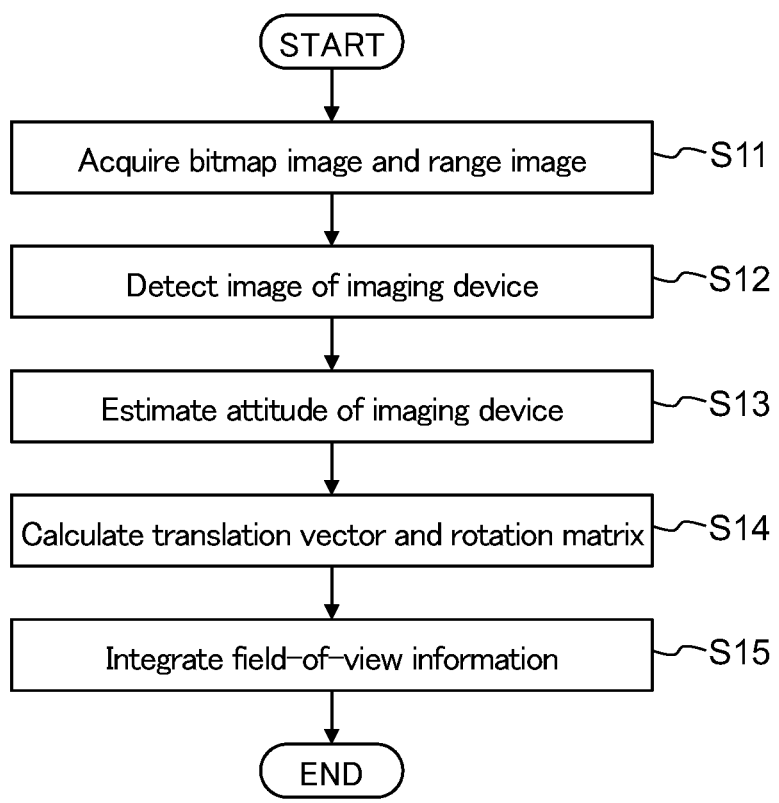
FIG. 5 is a diagram illustrating a flowchart of a calibration processing according to the first embodiment of the present invention.

FIG. 5 is a flowchart illustrating a calibration processing according to the first embodiment. The calibration processing is performed at a prescribed time. For example, when the imaging devices 210, 220 are installed in a mobile object such as a robot, the calibration processing is performed on a periodic basis. In another example in which the imaging device 210 is fixed, while the imaging device 220 is not fixed and is subjected to repeated movements or changes in attitude thereof, the calibration processing is performed after each of the movements or changes attitude of the imaging device 220.

In step S11, the bitmap image acquisition part 111 and the range image acquisition part 112 acquire a bitmap image and a range image, respectively, from a field-of-view image of each of the imaging devices 210, 220.

In step S12, the detection part 113: searches the bitmap image of each of the imaging devices 210, 220 for whether or not the bitmap image of the imaging device 210 contains an image of the imaging device 220 and whether or not the bitmap image of the imaging device 220 contains an image of the imaging device 210; and acquires the detected image, if any. Description below is made assuming that the bitmap image of the imaging device 210 contains an image of the imaging device 220.

In step S13, the attitude estimation part 114 estimates an attitude of the imaging device 220.

In step S14, the translation vector calculation part 115 calculates a translation vector from the imaging device 210 to the imaging device 220. The rotation matrix calculation part 116 also calculates a rotation matrix by which the coordinate system 221 of the imaging device 220 is aligned with the coordinate system 211 of the imaging device 210.

In step S15, the image registration processing part 117 integrates field-of-view information of each of the imaging devices 210, 220, using the translation vector and the rotation matrix (transformation information) calculated in step S14.

First Embodiment: Characteristics of Calibration Device

The calibration device 100 detects an image of the imaging device 220 contained in the bitmap image of the imaging device 210. The calibration device 100 calculates a translation vector from an image of the imaging device 220 contained in the range image of the imaging device 210. The calibration device 100: acquires an attitude of the imaging device 220 from the image of the imaging device 220 contained in the range image; and thereby calculates such a rotation matrix that aligns the coordinate systems of the imaging devices 210, 220 with each other. The calibration device 100 integrates the field-of-view information of each of the imaging devices 210, 220, using the translation vector and the rotation matrix (the transformation information).

The calibration device 100 can calculate the transformation information as long as a field of view of one of a pair of imaging devices contains an image of the other. That is, it is not required that respective fields of view of the imaging devices contain each other's images, which reduces restrictions on relative positions or orientations of the imaging devices in conducting calibration therebetween. This increases flexibility to change installed positions or orientations of the imaging devices.

Additionally, opportunities to carry out calibration is increased, thus improving accuracy of information on fields of view. For example, when a spatial map is created using imaging devices mounted in a mobile object, calibration can be performed in more cases or situations, which enhances accuracy of the spatial map.

When transformation information is acquired, information only on pixels of an image corresponding to an imaging device of interest in a field-of-view image of another imaging device is used in calculating a position or an attitude of the imaging device of interest, which requires a small processing load. A high-speed calibration can be thus performed. Additionally, a calibration processing can be repeatedly performed, which makes it possible to improve accuracy of transformation information, and, as a result, that of integration of field-of-view information.

<<Variation: Estimation of Attitude>>

In the embodiment described above, the attitude estimation part 114 calculates an attitude (coordinate axes and a basis vector) of an imaging device of interest, from a spread (a major component) of a point cloud of an image of the imaging device in a range image. Alternatively, an attitude of an imaging device of interest may be estimated from a bitmap image using machine learning technology. More specifically, an attitude of the imaging device may be estimated using a machine learning model which learns from training data in which a correct answer data of an attitude of the imaging device in a bitmap image is an actual attitude of the imaging device.

Second Embodiment

In the first embodiment, an attitude of an imaging device is estimated from a field-of-view image. When an imaging device has a high geometric symmetry (under a rotation or a mirror reflection) (for example, when the imaging device is cylindrical or rectangular), then, based on only a field-of-view image, an attitude of the imaging device cannot be determined or can be determined with a larger error. Even in that case, a calibration device according to a second embodiment can appropriately estimate an attitude of one of a pair of imaging devices and calculate transformation information, if a field of view of the one imaging device contains an image of the other, and at the same time, a field of view of the latter contains an image of the former.

Second Embodiment: Imaging Device

Figure 6:
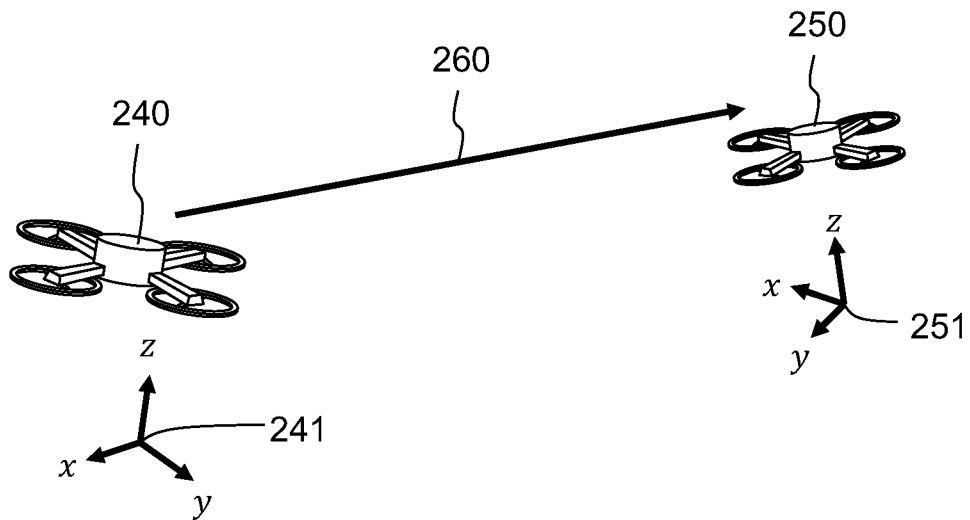
FIG. 6 is a diagram for explaining how an imaging device is imaged according to a second embodiment.

FIG. 6 is a diagram for explaining how a pair of imaging devices 240, 250 take respective images according to the second embodiment. Each of the imaging devices 240, 250: is mounted on an air vehicle (a drone); and has a 360-degree field of view. A translation vector 260 is a position vector of the imaging device 250 viewed from the imaging device 240.

The imaging devices 240, 250 each have a cylindrical main body. It is thus difficult to distinguish by appearance between a front and a rear portion or between a right and a left portion (an attitude) of each of the imaging devices 240, 250, though an upper and a lower portion thereof may be correctly determined. More specifically, even when the attitude thereof is estimated based on a position of a propeller of the air vehicle, an error by $\pi/2$, $\pi$, or $3\pi/2$ radians may be unavoidable.

Figure 7:
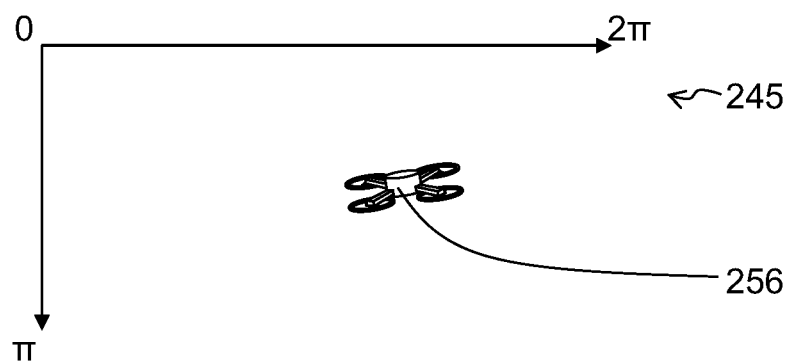
FIG. 7 is a diagram for explaining a bitmap image outputted by the imaging device according to the second embodiment.

FIG. 7 is a diagram for explaining a bitmap image 245 outputted by the imaging device 240 according to the second embodiment. The ordinate and the abscissa in the bitmap image 245 correspond to a zenith angle and an azimuth angle of a coordinate system 241 of the imaging device 240 (see FIG. 6), respectively. A subject 256 is an image of the imaging device 250 in the bitmap image 245.

Figure 8:
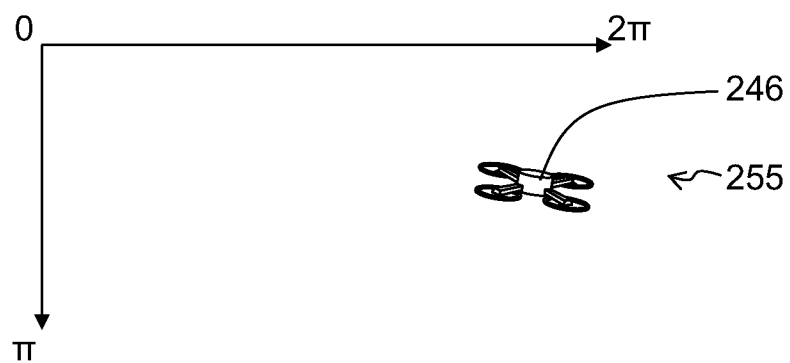
FIG. 8 is a diagram for explaining bitmap image outputted by another imaging device according to the second embodiment.

FIG. 8 is a diagram for explaining a bitmap image 255 outputted by the imaging device 250 according to the second embodiment. The ordinate and the abscissa in the bitmap image 255 correspond to a zenith angle and an azimuth angle of a coordinate system 251 of the imaging device 250 (see FIG. 6), respectively. A subject 246 is an image of the imaging device 240 in the bitmap image 255.

<<Calibration Device: Controller: Correction Processing Part>>

Figure 9:
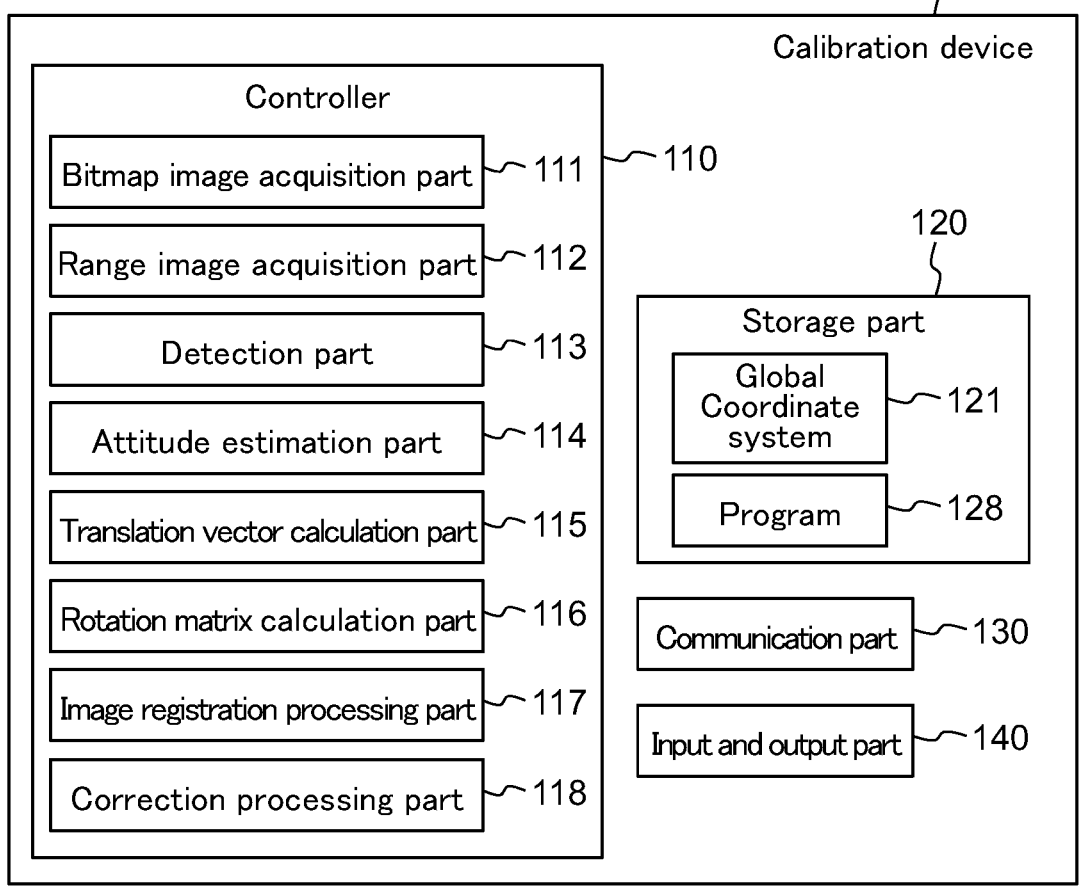
FIG. 9 is a functional block diagram illustrating a calibration device according to the second embodiment.

FIG. 9 is a functional block diagram illustrating a calibration device 100A according to the second embodiment. The calibration device 100A is the same as the calibration device 100 (see FIG. 2) according to the first embodiment, except that the calibration device 100A further includes a correction processing part 118 in the controller 110. Prior to explanation of the correction processing part 118, an error in estimating an attitude of the imaging device 250 is described next.

Figure 10:
FIG. 10 is a diagram for explaining an attitude of the imaging device estimated by an attitude estimation part of a calibration device according to the second embodiment.

FIG. 10 is a diagram for explaining an estimated result of an attitude of the imaging device 250 (see FIG. 6), which is estimated by the attitude estimation part 114 of the calibration device 100A according to the second embodiment. The coordinate system 241 represents a coordinate system of the imaging device 240. The x-y-z axes of the coordinate system 251 represent the x-y-z axes of a coordinate system of the imaging device 250, respectively. The x'-y'-z axes of the coordinate system 251 is a coordinate system of the imaging device 250 calculated (estimated) by the attitude estimation part 114. Though the attitude estimation part 114 correctly determines which direction is the z-axis of the imaging device 250, that is, an upper and lower direction thereof, the attitude estimation part 114 incorrectly determines the x-y axes by $\pi$ radians, failing to determine a front and rear direction and a left and right direction thereof. This inconveniently results in an incorrect calculation of a rotation matrix by the rotation matrix calculation part 116. The correction processing part 118 corrects such an erroneously calculation result.

Figure 11:
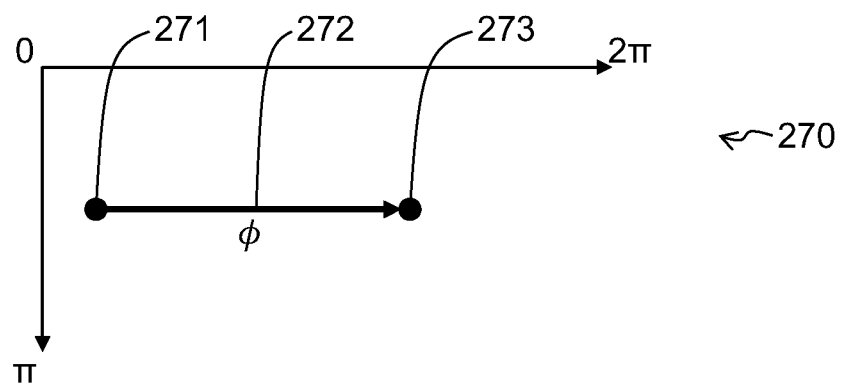
FIG. 11 is a diagram for explaining a correction processing performed by a correction processing part according to the second embodiment.

FIG. 11 is a diagram for explaining a correction processing performed by the correction processing part 118 according to the second embodiment. An angular coordinate 270 is a 2D coordinate with the ordinate denoting an azimuth angle and the abscissas denoting a zenith angle. Let PBA be a translation vector from the imaging device 240 to the imaging device 250 calculated by the translation vector calculation part 115. Let RBA be a rotation matrix calculated by the rotation matrix calculation part 116. A point 273 denotes a zenith angle component and an azimuth angle component of −RBA·PBA. If the attitude estimation part 114 correctly estimates an attitude of the imaging device 250, the calculated vector becomes equal to a translation vector from the imaging device 250 to the imaging device 240.

A point 271 denotes a zenith angle component and an azimuth angle component of a translation vector with respect to the imaging device 240 viewed from the imaging device 250. A difference 272 represents a difference value φ between the point 271 and a point 273. In this embodiment, since the z-axis and the translation vector are correctly estimated, the zenith angle component of the difference value φ is zero, leaving only the azimuth angle component.

Thus, an attitude of the imaging device 250 can be correctly estimated by rotating a basis vector of the coordinate system 251 of the imaging device 250 viewed from the imaging device 240, by φ about the z-axis of the coordinate system 251. The correction processing part 118: calculates a rotation matrix T for an appropriate correction, using Rodrigues' rotation formula; and outputs the corrected rotation matrix as RBA·T$^{-1}$ (T$^{-1}$ is an inverse matrix of T).

<<Calibration Processing>>

FIG. 12 is a flowchart illustrating a calibration processing according to the second embodiment. The calibration processing is performed at a prescribed time, for example, at regular intervals.

In step S21, the bitmap image acquisition part 111 and the range image acquisition part 112 acquire a bitmap image and a range image, respectively, from each of respective field-of-view images of the imaging devices 240, 250.

In step S22, the detection part 113: searches the respective bitmap images of the imaging devices 240, 250 for whether or not either of the bitmap images contain an image of the other's imaging device.

In step S23, if either of the bitmap images containing an image of the other's imaging device is detected in step S22 (step S23→YES), the detection part 113 advances the processing to step S24. If neither of the bitmap images containing an image of the other's imaging device is detected in step S22 (step S23→NO), the detection part 113 terminates the calibration processing.

In step S24, the attitude estimation part 114 estimates an attitude of the detected imaging device.

In step S25, the translation vector calculation part 115 calculates a translation vector toward the detected imaging device. The rotation matrix calculation part 116 calculates a rotation matrix by which a coordinate system of the detected imaging device is aligned with a coordinate system of the other imaging device.

Note that, if one of the imaging devices 240, 250 is detected in a bitmap image of the other, and vice versa, steps S24 and S25 are performed to each of the imaging devices 240, 250.

In step S26, if each of the imaging devices 240, 250 is contained in each other's field of view (step S26→YES), the detection part 113 advances the processing to step S27. If each of the imaging devices 240, 250 is not contained in each other's field of view (step S26→NO), the detection part 113 advances the processing to step S29. The terms "contained in a field of view" used herein means that one of the imaging devices detects, in a field-of-view thereof, an image of the other imaging device.

In step S27, if a length of the difference value φ (see FIG. 11) calculated from the translation vector and the rotation matrix is smaller than a prescribed value, meaning that an attitude of the imaging device of interest in the other's field of view is correctly estimated (step S27→Correct), the correction processing part 118 advances the processing to step S29. If the length of the difference value φ is larger than the prescribed value (step S27→Incorrect), the correction processing part 118 advances the processing to step S28.

In step S28, the correction processing part 118 calculates a rotation matrix T used for correction, based on the difference value φ; corrects the rotation matrix calculated in step S25; and returns the processing to step S27.

Note that steps S27 and S28 may be performed to each of the imaging devices 240, 250 or may be performed to either of the imaging devices 240, 250. Or, in place of using the difference value φ, steps S27 and S28 may be repeated until a difference between the rotation matrix T used for correction and an identity matrix takes a value as small as a prescribed value.

In step S29, the image registration processing part 117 integrates field-of-view information of the imaging device 240 and field-of-view information of the imaging device 250.

Second Embodiment: Characteristics of Calibration Device

In the second embodiment, calibration can be appropriately performed, even when an imaging device of interest has a high geometric symmetry (under a rotation or a mirror reflection) (for example, and an attitude of the imaging device cannot be uniquely determined or is erroneously estimated. Additionally, when, for example, a pair of ranging devices performs estimation, the second embodiment can be used in double-checking a possible unexpected estimation result outputted by one of a pair of the ranging devices, which improves robustness.

<<Variation: Three or More Imaging Devices>>

In the embodiment described above, the number of units of the imaging device is two. The number may be, however, three or more. In that case, the calibration processing illustrated in FIG. 12 may be performed to a pair of any imaging devices.

<<Other Variations>>

In the embodiments described above, a single unit of the calibration device 100/100A performs a calibration processing. Instead, a plurality of calibration devices may perform a calibration processing in a distributed manner. Or, a plurality of imaging devices may each have the controller 110 (a CPU) and perform a calibration processing in parallel.

An imaging device may perform part of a processing. For example, in the first embodiment, each of imaging devices may: calculate transformation information; and transmit the calculated transformation information together with field-of-view information to a calibration device, at which the field-of-view information transmitted from each of the imaging devices is integrated.

Some embodiments according to the present invention have been explained as aforementioned. Those embodiments are intended to be illustrative of the present invention and are not, however, deemed as limitation of a technical scope of the present invention. The present invention can be carried out in various embodiments other than those described above. Various modifications such as omission and substitution can also be made to the present invention without departing from the scope of the gist thereof. Those embodiments and variations are included in the scope of claims and abstract described in the present specification as well as the inventions described in the scope of the claims and its equivalents.

DESCRIPTION OF REFERENCE NUMERALS 100, 100A calibration device
111 bitmap image acquisition part
112 range image acquisition part
113 detection part (state estimation part)
114 attitude estimation part (state estimation part)
115 translation vector calculation part (transformation information calculation part)

116 rotation matrix calculation part (transformation information calculation part)
117 image registration processing part (field-of-view integrate processing part)
118 correction processing part
210, 220, 240, 250 imaging device
211, 221, 241, 251 coordinate system
212 bitmap image
213 range image
230, 260 translation vector (relative position)

The invention claimed is:

1. A calibration device which performs a calibration between a plurality of imaging devices, each of which outputs field-of-view information which is information on a field-of-view of the imaging device itself, the field-of-view information including a bitmap image and a range image, the calibration device comprising:
a state estimation part configured to
detect, in a field of view of a first imaging device, a single image of a second imaging device, and
estimate a relative position and a relative attitude of the second imaging device with respect to the first imaging device, solely based on the single detected image;
a transformation information calculation part configured to calculate transformation information between a coordinate system of the first imaging device and a coordinate system of the second imaging device, based on the estimated relative position and relative attitude,
wherein the range image is an image in which range information is added to each pixel of the range image; and
wherein each of the imaging devices is an aerial imaging device without a stationary position; and
wherein each of the imaging devices is capable of measuring a distance between itself and a target and distance between the imaging devices is not known beforehand.

2. The calibration device according to claim 1, further comprising
a field-of-view integrate processing part configured to make a point contained in field-of-view information outputted from the first imaging device associated with a point contained in field-of-view information outputted from the second imaging device, using the calculated transformation information, and thereby integrate the field-of-view information outputted from the first imaging device with the field-of-view information outputted from the second imaging device.

3. The calibration device according to claim 2,
wherein the field-of-view integrate processing part uses the transformation information as an initial value of an iterative computation processing in which the two points in each of the field-of-view information are made to be associated with each other.

4. The calibration device according to claim 1,
wherein the state estimation part is configured to: extract a centroid and a major component from a spatial distribution of range information of the second imaging device contained in the range image outputted by the first imaging device; and estimate a relative position and a relative attitude of the second imaging device.

5. The calibration device according to claim 1,
wherein the state estimation part is configured to estimate a relative attitude of the second imaging device, using a machine learning model which learns from training data in which an attitude of the second imaging device is a correct answer data from among images of the second imaging device contained in bitmap images outputted by the first imaging device.

6. The calibration device according to claim 1,
wherein the transformation information is a translation vector from the first imaging device to the second imaging device and a rotation matrix by which an orientation of the first imaging device is aligned with an orientation of the second imaging device.

7. The calibration device according to claim 1,
further comprising a correction processing part,
wherein the state estimation part is configured to: detect an image of the first imaging device in a field of view of the second imaging device; and estimate a relative position and a relative attitude of the first imaging device with respect to the second imaging device,
wherein the transformation information calculation part is configured to calculate second transformation information based on the relative position and the relative attitude of the first imaging device, and
wherein the correction processing part is configured to correct at least one of the transformation information and the second transformation information, based on a difference calculated from the transformation information and the second transformation information.

8. The calibration device according to claim 7,
wherein the difference is a difference calculated from at least one of:
(1) a difference: between a relative position of the second imaging device with reference to the first imaging device, the relative position being estimated from a field-of-view image outputted by the first imaging device; and a relative position of the second imaging device with respect to the first imaging device calculated from the second transformation information, and
(2) a difference between: a relative position of the first imaging device with respect to the second imaging device, the relative position being estimated from a field-of-view image outputted by the second imaging device; and a relative position of the first imaging device with respect to the second imaging device, the relative position being calculated from the transformation information.

9. The calibration device according to claim 7,
wherein the correction processing part is configured to repeat the correction until the difference takes a value equal to or smaller than a prescribed value.

10. A calibration method of a calibration device, comprising the steps of:
detecting, in a field of view of a first imaging device, an image of a second imaging device, the first imaging device being an imaging device outputting field-of-view information including a bitmap image and a range image, and estimating a relative position and a relative attitude of the second imaging device with respect to the first imaging device solely based on a single detected image of the second device; and
calculating transformation information between a coordinate system of the first imaging device and a coordinate system of the second imaging device, based on the estimated relative position and relative attitude,
wherein the range image is an image in which range information is added to each pixel of the range image, and
wherein each of the imaging devices is an aerial imaging device without a stationary position, and wherein each of the imaging devices is capable of measuring a distance between itself and a target and distance between the imaging devices is not known beforehand.

\* \* \* \* \*